United States Patent [19]

Kuckes

[11] 4,323,848
[45] Apr. 6, 1982

[54] PLURAL SENSOR MAGNETOMETER ARRANGEMENT FOR EXTENDED LATERAL RANGE ELECTRICAL CONDUCTIVITY LOGGING

[75] Inventor: Arthur F. Kuckes, Ithaca, N.Y.

[73] Assignee: Cornell Research Foundation, Inc., Ithaca, N.Y.

[21] Appl. No.: 130,764

[22] Filed: Mar. 17, 1980

[51] Int. Cl.³ .............................................. G01V 3/26
[52] U.S. Cl. .................................. 324/338; 324/247; 324/258; 324/346
[58] Field of Search ................................ 324/338–340, 324/343, 345, 346, 221, 244, 247, 253, 258

[56] References Cited

U.S. PATENT DOCUMENTS

| | | |
|---|---|---|
| 1,791,933 | 2/1931 | Muesser . |
| 1,803,405 | 5/1931 | Ricker . |
| 1,845,379 | 2/1932 | West . |
| 1,902,265 | 3/1933 | Rieber . |
| 1,906,271 | 5/1933 | Jakosky .................. 324/345 |
| 1,934,079 | 11/1933 | Lundberg et al. . |
| 1,934,447 | 11/1933 | Ricker . |
| 1,997,163 | 4/1935 | Zuschlag . |
| 2,062,630 | 12/1936 | Zuschlag . |
| 2,108,463 | 2/1938 | Zuschlag . |
| 2,199,367 | 4/1940 | Athy et al. . |
| 2,262,419 | 11/1941 | Athy ........................ 324/338 |
| 2,291,692 | 8/1942 | Cloud . |
| 2,359,894 | 10/1944 | Brown ...................... 324/346 |
| 2,364,159 | 12/1944 | Muffly . |
| 2,428,155 | 9/1947 | Guyod ...................... 324/346 |
| 2,663,004 | 12/1953 | Seigel . |
| 2,694,793 | 11/1954 | Martin ................... 324/345 X |
| 2,723,374 | 11/1955 | Williams ............... 324/343 X |
| 2,730,673 | 1/1956 | Jakosky .................. 324/345 |
| 2,746,009 | 5/1956 | McLaughlin et al. .... 324/339 |
| 2,787,758 | 4/1957 | Walstrom . |
| 3,040,247 | 6/1962 | Van Allen ............... 324/253 |
| 3,398,356 | 8/1968 | Still . |
| 3,453,531 | 7/1969 | Warren .................. 324/346 |
| 3,479,581 | 11/1969 | Runge .................... 324/338 |
| 3,525,037 | 8/1970 | Madden et al. . |
| 3,697,864 | 10/1972 | Runge . |
| 3,731,752 | 5/1973 | Schad . |
| 3,763,419 | 10/1973 | Barringer . |
| 3,778,701 | 12/1973 | Runge . |
| 3,845,381 | 10/1974 | Hart ....................... 324/221 |
| 3,849,722 | 11/1974 | Nilsson . |
| 3,984,758 | 10/1976 | Millon . |
| 4,050,013 | 9/1977 | Maddox ................ 324/244 X |

FOREIGN PATENT DOCUMENTS

| | | | |
|---|---|---|---|
| 472314 | 10/1976 | U.S.S.R. ............... 324/244 |
| 678438 | 8/1979 | U.S.S.R. ............... 324/346 |

*Primary Examiner*—Gerard R. Strecker
*Attorney, Agent, or Firm*—Jones, Tullar & Cooper

[57] ABSTRACT

A method of well logging in petroleum exploration and apparatus for use in the method is described. An improved magnetometer is disposed in a well bore to provide indications of the distribution, filimentation, and distortion of a controlled current flow within adjoining strata of interest. The current flow is excited by a distant alternating source located at the surface or at other boreholes, and perturbations in the current flow and accompanying magnetic field caused by the electrical characteristics of the adjoining strata are registered by the magnetometer.

The magnetometer comprises two pairs of elongated U-shaped cores of laminated, high-permeability metal, adjacent portions of each pair being surrounded by a sensing coil. The coil outputs are fed to surface equipment for detection and analysis.

20 Claims, 10 Drawing Figures

PLURAL SENSOR MAGNETOMETER ARRANGEMENT FOR EXTENDED LATERAL RANGE ELECTRICAL CONDUCTIVITY LOGGING

BACKGROUND OF THE INVENTION

The present invention relates, in general, to well logging methods useful in petroleum exploration, and more particularly to an improved, highly sensitive, down hole magnetometer for detecting field perturbations caused by geologic structures in the vicinity of a well bore.

Geophysical well logging methods are extremely important in the exploration for petroleum deposits and for the systematic development of an oil field for production after it has been located. Historically, electrical conductivity and self potential measurements for these purposes have been important, and over the years numerous patents have issued on such techniques and the apparatus for carrying them out. Typical examples of the approaches taken in the prior art are found in U.S. Pat. No. 2,359,894 to Brown et al., U.S. Pat. No. 2,723,374 to Williams, and U.S. Pat. No. 3,697,864 to Runge. In Brown et al., electrodes are embedded in the earth or are placed in boreholes spaced from a main borehole in which is placed a measuring unit responsive to the current flow between the electrodes. In the Williams patent, current injection is accomplished by electrodes which may be suspended in the main borehole a predetermined distance from the measuring unit, which is also suspended in the borehole. As an alternative, the patent discloses the use of surface electrodes for current injection. The Runge patent discloses a plurality of current electrodes and a plurality of potential measuring electrodes secured at spaced locations along a logging cable or to a drill string within a well bore. In each of the foregoing patents, the current injected into the geological formations surrounding the borehole is either D.C. or very low frequency A.C., and variations in the electrical current flow due to variations in the conductivity or resistivity of the geological formations are measured. Such measurements may be made by way of current or voltage sensitive electrodes, by induction coils, or the like.

The patterns of current flow and the variations in potential which exist within the geological formations surrounding the borehole have a direction and magnitude at any given location which reflect the electrical conductivity or resistivity of the stratum in that area. By measuring and recording these variations, it is possible to determine the general characteristics of the formations, and to identify anomalies which would indicate the probable locations and dimensions of mineral beds, petroleum bearing deposits, and the like.

However, prior systems for the logging of geological formations have been found to be of limited usefulness, since they lack the sensitivity required to make meaningful measurements at any appreciable distance from the current or voltage source. Thus, the measurements have been limited to relatively short lateral distances from the borehole, or where the source electrodes are located at the surface of the earth, at relatively shallow depths. As a result, it has been difficult to obtain accurate measurements of deposits which are not actually penetrated by the borehole, and even where the borehole passes through or very close to the edge of a deposit, it has been difficult to determine with any degree of certainty the dimensions of the deposit. Thus, although a deposit may disturb a current flow pattern, the lack of sensitivity in prior measuring devices has made it difficult, if not impossible, to determine the nature of the geological anomaly any appreciable distance from the point of measurement.

Attempts have been made to solve this problem through the provision of more sensitive detectors, and to this end magnetometers sensitive to faint magnetic fields have been proposed. However, in order to obtain accurate measurements of subsurface magnetic fields, the horizontal components of the fields must be detected, and in prior devices this required a horizontally oriented magnetometer having significant horizontal dimensions. Unfortunately, exploratory well bores have a diameter of between about 4 and 6 inches, and simply do not provide the space needed for conventional magnetometers of the required sensitivity. In order to accommodate prior magnetometers, then, it was often necessary to redrill existing exploratory wells, or to drill new exploratory wells with much greater diameters. This not only has prohibitively expensive, but did not result in significantly better results.

SUMMARY OF THE INVENTION

It is, therefore, an object of the present invention to provide a method of geophysical exploration that will provide accurate and reliable information concerning deposits of minerals and of hydrocarbons located a substantial distance from a borehole and at substantial depths. It is also an object of the invention to provide an improved magnetometer for use in such exploration which will have a high degree of sensitivity to variations in magnetic fields due to geological anomalies, and which will have dimensions that will permit its use in small-diameter well bores such as those drilled for exploration purposes.

The present invention is an electromagnetic well logging method and apparatus for obtaining electrical conductivity data a considerable distance from a borehole, and finds particular application in the logging of petroleum bearing strata, which are electrically conductive. The invention provides integration of the measured electrical conductivity over a large laterally extending volume, and permits detection of lateral variations in conductivity, measurement of the lateral direction in which the conductivity is changing, and detection of the lateral extent of conductive beds of material. In general, this is accomplished by exciting the strata in the vicinity of a borehole by means of an A.C. surface source. A sensitive magnetometer is lowered down the borehole and the depth dependance of the A.C. magnetic fields produced by the source is determined by means of a large number of measurements of the magnitude, phase, and direction of the fields in the strata near the hole. Any non-uniform electrical conductivity of the strata leads to a concentration of currents and of magnetic fields produced by the source into the more highly conductive strata, and their location and nature can be identified by analysis of the depth variations obtained from measurements made over a period of time.

To obtain the required data, the magnetometer of the present invention is used in conjunction with a conventional electronic compass and with a vertical field sensor which may be integrated with the magnetometer or be separate. The magnetometer is used to measure the horizontal A.C. magnetic field components produced by a surface loop or by electrode injected currents and the compass measures the earth's magnetic field to determine the azimuthal orientation of the instrument. The horizontal field magnetometer consists of a pair of magnetic field sensors, each sensor comprising two generally U-shaped core segments, each segment having two spaced parallel legs extending from an intermediate body portion. The core is constructed of a laminated, high permeability magnetic material, and the core segments are assembled back-to-back with a common coil of about 25,000 turns surrounding the adjacent core body portions. The core segments have highly elongated legs, on the order of 18 inches, as compared to a short body portion length of about two to three inches, so that the effective diameter of the sensors allows the magnetometer to fit within an exploratory well bore.

The core segments each are formed of multiple continuous laminations of mu-metal, each lamination extending the full length of the core segment. After formation of the two segments into their respective U-shapes, the cores are assembled back-to-back, with the legs extending in opposite directions, but in the same plane, and are secured by means of a nonmagnetic channel member which is crimped tightly around the laminations to hold them securely together and to hold the core segments in assembled relationship. The assembled segments are then carefully annealed to provide high permeability, and thereafter the coil is wound around the adjacent intermediate body portions. Suitable spacers are then secured to the free ends of the core legs, as by welding to the channel member, to complete the field sensor.

Two sensors arranged along a common axis form the magnetometer of the present invention, with one sensor lying in a first plane and the second sensor lying in a second plane which is perpendicular to the first. The two sensors are secured in end-to-end relationship, but spaced a short distance from each other, and the entire unit is mounted within a nonmagnetic housing of low electrical conductivity having an outer diameter of less than about four inches, which is small enough to permit its use in a borehole. Included in the housing with the magnetometer is an electronic compass, a suitable power supply, and electronic circuiting for detecting the signals produced by the magnetometer and transmitting them to the surface for processing.

The magnetometer of the present invention is lowered into a vertical borehole, and by virtue of its exceptional length, totalling about two meters for the two sensors, is capable of accurate and highly sensitive measurements of alternating magnetic fields caused by injected currents. The measurements so obtained are used in conjunction with vertical field measurements to provide the required data.

BRIEF DESCRIPTION OF THE DRAWINGS

The foregoing and additional objects, features and advantages of the present invention will become apparent to those of skill in the art from a consideration of the following detailed description of a preferred embodiment thereof taken in conjunction with the accompanying drawings in which.

DESCRIPTION OF A PREFERRED EMBODIMENT

Figure 1:
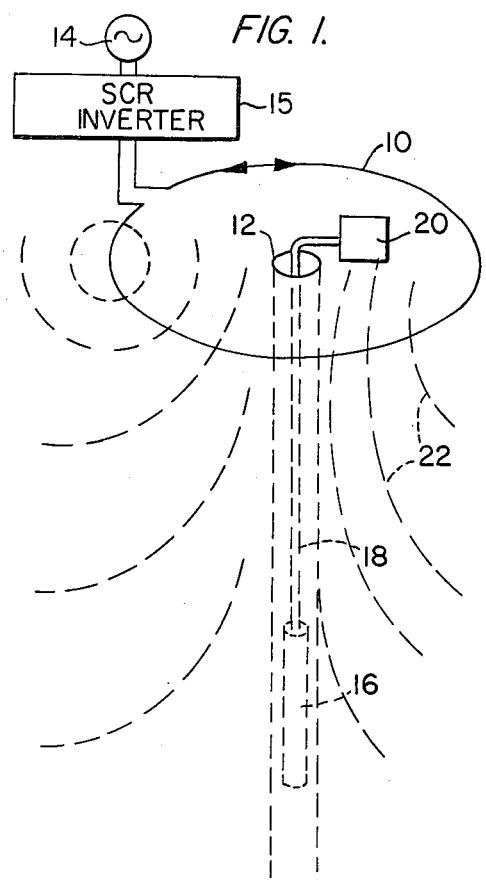
FIG. 1 is a diagrammatic illustration of a well logging system utilizing a loop source of current.

Turning now to a more detailed consideration of the drawings, there is illustrated in FIG. 1 a well logging system of the type that may be used with the improved magnetometer of the present invention to obtain highly accurate indications of geological formations, and particularly of formations which contain electrically conductive material, to facilitate the location and mapping of petroleum and brine pools, mineral deposits, and the like. Since the present magnetometer is particularly useful in locating petroleum deposits, the following description of a preferred embodiment will have specific reference to such an application. However, it should be understood that the invention is not limited to the location of petroleum deposits, and that other deposits, such as minerals, which produce anomalies in the underground magnetic fields and electrical currents may also be detected and identified.

The association of gas, oil and brine in porous geological structures is well known, and electrical methods may be used in well logging because of the high electrical conductivity of such brines, because of the much lower conductivity of petroleum, and because of the resistivity of host rock formations. The stratographic setting of petroleum and the associated brine, which appear in relatively thin horizontal lenticular bodies with a few kilometers lateral extent, leads to characteristic perturbations of electric current flows or of magnetic fields in their proximity. These perturbations depend not only upon the characteristics of the stratographic structure actually pierced by the borehole, but upon the characteristics of neighboring structures as well, and the accurate measurement of these perturbations can give valuable geophysical information. By means of the sensitive magnetometer of this invention, the distribution, filimentation, and distortion of a controlled subsurface current flow, produced either by distant electrodes to which an A.C. source is applied or by a controlled magnetic field which is in turn caused by a current flow at the surface, can be accurately measured. Since the electric currents so produced will try to follow paths of least resistance, these currents will be concentrated or spread out by the characteristic conductivity or resistivity of the strata, and the areas of concentration or separation will be manifested by magnetic field gradients which are detected by the magnetometer of the invention to produce "signatures" in the magnetometer output signals. It has been found that the magnetometer of the present invention will produce such characteristic signatures even in situations where presently available resistivity and conductivity well logs indicate uniformity in the strata. It has further been found that such information can be obtained at a much greater lateral distance from the borehole than was heretofore possible.

Figure 2:
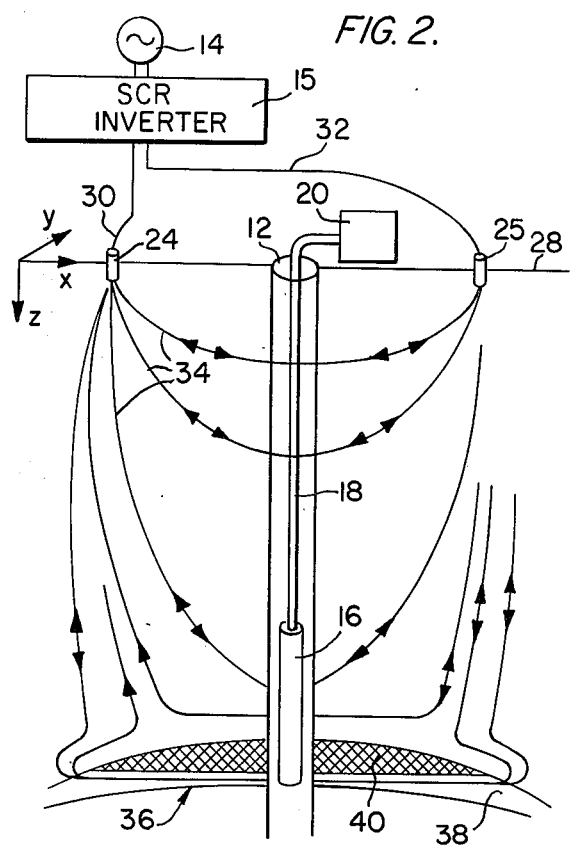
FIG. 2 is a diagrammatic illustration of a well logging system utilizing a current dipole.

FIGS. 1 and 2 illustrate two methods for creating the desired magnetic fields in the strata of interest. In FIG. 1, a magnetic field is produced by means of a single turn current loop formed by a cable 10 located on the surface of the earth and surrounding a borehole 12. The cable forms a loop which may, for example, be 800 meters or more in diameter and excited by a suitable source 14 of alternating current. The A.C. source is supplied by way of a silicon controlled rectifier inverter 15 which produces an alternating square wave current of about 20 amperes. In a test of the magnetometer of the present invention, it was found that a suitable magnetic field could be produced at frequencies below 60 Hz, with good results being obtained in tests using sources of 7 Hz or 36 Hz.

Borehole 12 is a typical exploration hole which is cased in the normal manner with 5½ inch inner diameter nonmagnetic, nonconductive (e.g., fiberglass) pipe over at least a part of its depth. A magnetometer 16 constructed in accordance with the invention is suspended in the well hole by means of a standard well logging cable 18 which may for example, be 15,000 feet long. The cable includes suitable electric wiring to permit connection of the electronics in the magnetometer 16 with surface processing circuitry 20 which may be mounted in a truck or trailer for portability from one borehole to another.

The flow of current in the single turn loop cable 10 produces a magnetic field generally indicated by lines 22, the lines of magnetic field force being centered on the cable 10 and extending to a considerable depth within the earth. As indicated above, the exact pattern followed by the magnetic field will depend upon the electrical characteristics of the earth's structure. Layers of conductive material or layers of non-conductive material will disturb the regular lines of flux for the magnetic field, producing anomalies, or aberrations, which can be detected by the magnetometer.

FIG. 2 illustrates an alternative mode for obtaining the desired magnetic field within the strata of interest. In this arrangement, the loop 10 is replaced by a pair of electrodes 24 and 25 which may be embedded in the ground at the surface or which may be located within additional boreholes in the vicinity of the hole 12. As illustrated, electrodes 24 and 25 are located at the surface 28 and the source of alternating current 14 is connected thereacross by way of cables 30 and 32. In one test of the magnetometer of the invention, the electrodes were spaced apart by about 1,200 meters and a current of approximately 20 amperes was fed to them. Again the alternating source may be a square wave operated at 60 Hz or less, with 7 Hz and 36 Hz providing suitable results.

The source connected across electrodes 24 and 25 produces a potential difference therebetween which results in a current flow extending through the strata beneath the surface of the ground 28. The current flow will follow a multitude of paths, as diagrammatically illustrated by the current flow lines 34, with the exact path followed by the current being dependant upon the conductivity characteristics of the strata and the location of the electrodes. For example, an oil bearing stratum is generally indicated at 36, with the stratum including a pool of conductive brine 38 covered by a layer 40 of lower conductivity petroleum. If this petroleum and brine deposit occurs in a surrounding stratum of relatively uniform conductivity, the disturbance created by the deposit will be substantial, as broadly illustrated in the drawing, and the resulting disturbance in the current flow can be detected by the magnetometer 16. It will be understood that electric currents illustrated by lines 34 generate corresponding magnetic fields, with the intensity of the current j at any point in space being related to the magnetic field B in accordance with the Maxwell equation: $\nabla \times B = \mu_0 j$, where $\mu_0 = 4\pi \times 10^{-7}$ (MKS units). With a Cartesian coordinate system for the systems of FIGS. 1 or 2, equation 1 can be written as:

$$\mu_0 j x = \frac{dBz}{dy} - \frac{dBy}{dz}$$

$$\mu_0 j y = \frac{dBx}{dz} - \frac{dBz}{dx}$$

$$\mu_0 j z = \frac{dBy}{dx} - \frac{dBx}{dy}$$

Since in the applications of the invention envisaged, the dominant structural variation of the strata is in the horizontal (x,y) plane, it has been found that many of the stratographic configurations of interest produce their most important and most characteristic magnetic field variations in the vertical (z) direction so that field variations with respect to depth are significant. Accordingly, in accordance with the invention, the x and y components of the magnetic field are measured at various depths, and the variations are plotted to provide a field profile in the z, or depth direction. The resulting field characteristics then provide information concerning the nature of the strata surrounding the borehole.

Figure 3:
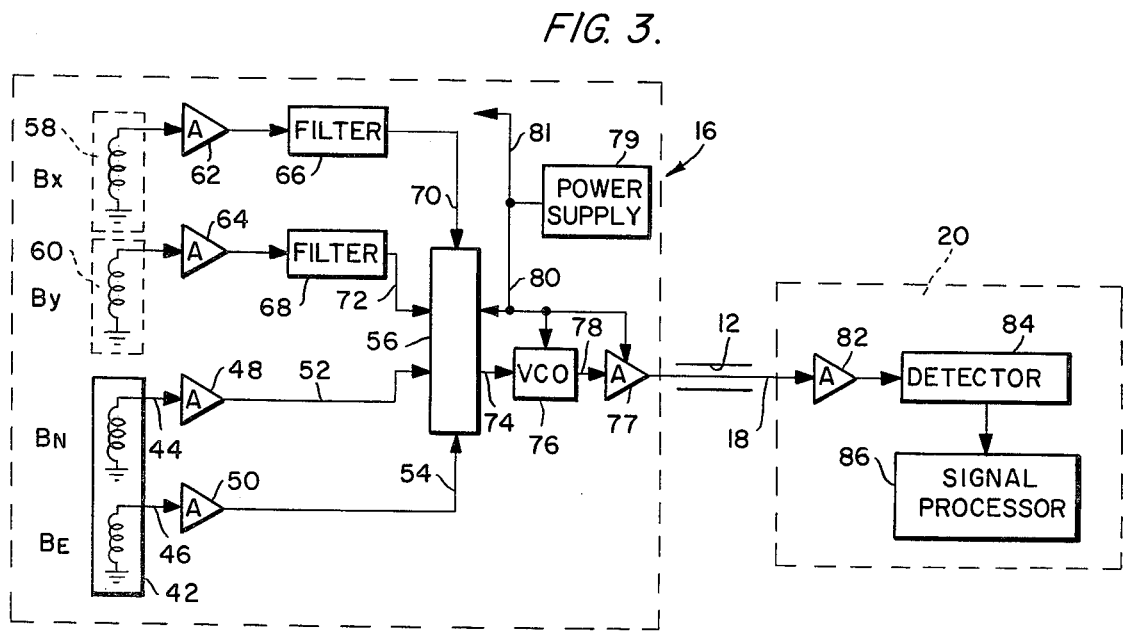
FIG. 3 is a diagrammatic illustration of circuitry for use with the present invention.
Figure 4:
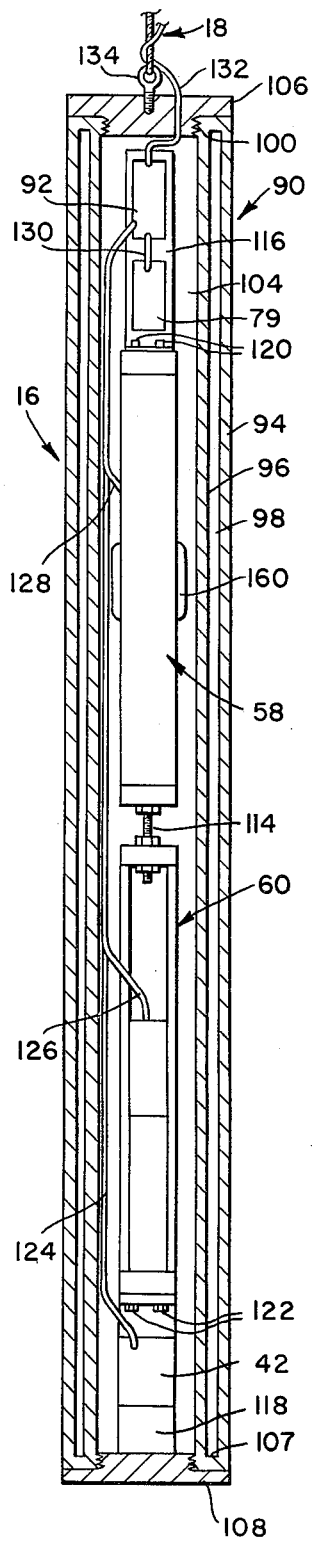
FIG. 4 is a partial sectional view of a magnetometer constructed in accordance with one form of the present invention.

The downhole magnetometer equipment 16 is illustrated in diagrammatic form in FIG. 3, to which reference is now made. The magnetometer includes a conventional electronic fluxgate compass 42 which may include a pair of coils oriented at right angles to each other and mounted in the horizontal (x,y) plane to measure the earth's magnetic field. The outputs 44 and 46 represent the horizontal components BN and BE, respectively, of the earth's magnetic field, and these may be fed through preamplifiers 48 and 50, respectively, which may be a part of the compass, to corresponding inputs 52 and 54 of a multiplexer 56. It should be understood that the compass 42 is conventional and that its components are shown diagrammatically for purposes of illustration only.

The magnetometer unit 16 also incorporates a pair of A.C. field sensors 58 and 60 which include sensor coils wound on specially prepared magnetic cores to be described. The coils and their cores are mounted at right angles to each other so that sensor 58 is responsive to changes in magnetic flux in the x direction and sensor 60 is responsive to changes in magnetic flux in the y direction. The outputs of the two sensor coils are fed through preamplifiers 62 and 64, respectively, and through filters 66 and 68, respectively, to inputs 70 and 72 of the multiplexer 56. The filters 66 and 68 are notch filters which are selected to pass output signals from the coils 58 and 60 which correspond in frequency to the frequency of source 14.

Multiplexer 56 is designed to sweep through the inputs 70, 72, 52, 54 in sequence with the respective outputs being supplied sequentially by way of line 74 to the input of a voltage controlled oscillator 76. Oscillator 76 may operate, for example, at a carrier frequency of approximately 100 kiloHertz and is modulated by the voltages supplied in sequence from the sensor coils and the compass coils through the multiplexer. The modulated carrier signal is fed to an amplifier 77 by way of line 78, and the output of the amplifier is fed to the borehole cable 18. A power supply 79, which may be a battery pack, provides suitable downhole bias voltages for operating the downhole electronics, with power being supplied by way of line 80 to the multiplexer, the voltage controlled oscillator 76 and preamplifier 77 and by way of line 81 to preamplifiers 62 and 64, as well as to other parts of the circuit. At the surface, the signal is again amplified by amplifier 82 and is fed through detector circuitry 84 to suitable signal processing circuitry 86 for signal averaging, display, recording, and the like. The various signal processing functions may be carried out by means of a microprocessor such as a commercially available SYM-1, manufactured by Synertek Systems Corp. For signal averaging, the processor may accumulate the input signals from the borehole sensors over an appropriate period of time (for example, 5 to 30 minutes), averaging the signal and printing out the results on a computer print-out terminal. The information thus accumulated for each depth location of the magnetometer unit 16 may then be analyzed to determine the parameters of the magnetic fields at various depths.

A preferred form of the structure of the borehole magnetometer unit 16 is illustrated in FIGS. 4 through 8, to which reference is now made. The unit comprises a housing 90 which is adapted to receive the sensors 58 and 60, the magnetic compass 42, the power supply 79, and an electronics package 92 which includes the various amplifiers, the filters, the multiplexer, the voltage controlled oscillator, and like down hole circuitry illustrated in FIG. 3. The housing 90 preferably is a double-walled tubular container of the vacuum bottle type which serves to insulate the contents of the bottle from the heat encountered in the typical down hole environment. Thus, housing 90 is constructed with an outer wall 94 spaced from a concentric inner wall 96 to define an interior space 98. The interior space is closed and sealed at both ends of the container by radially extending walls 100 and 102 so that a vacuum may be maintained therein. The outer diameter of the housing is substantially less than the $5\frac{1}{2}$ inch inner diameter of the typical exploratory well casing for borehole 12, and preferably has a diameter of approximately 4 inches so that the unit 16 may move easily within the borehole.

The inner wall of the housing defines an interior cavity 104 which receives the sensors, compass and electronic equipment, the cavity being closed by an upper cap 106 and a lower cap 108 which are threaded into the housing to hermetically seal cavity 104. Preferably, the housing 90 is constructed of a non-magnetic metal to provide the strength required for withstanding the hazardous high temperature environment of a borehole, while allowing detection of the surrounding magnetic fields.

The sensor units 58 and 60 are adapted to be removably mounted within housing 90, with the first sensor unit located near the upper end of housing 90 and the second sensor 60 located in the lower end of the housing. The two sensors are secured together in spaced, end-to-end coaxial relationship by means of a suitable fastener 114, the fastener serving to rigidly secure the two sensors for placement in and mounting within the housing. The two sensors are mounted so that their respective planes are at right angles to each other, whereby one sensor is adapted to measure magnetic fields in the "x" direction and other is adapted to measure magnetic fields in the "y" direction. For purposes of reference, sensor 58 may be said to lie in the x plane, or x-measuring plane, and sensor 60 may be said to lie in the y, or y-measuring, plane. Fastener 114, which is shown for purposes of illustration as being a bolt secured to the respective sensors by suitable nuts and lock washers, holds the sensors in an end-to-end relationship so that they can be mounted coaxially within housing 90. Suitable radially-extending spacers (not shown) may be mounted on the sensors to center them with respect to the interior wall 96 and to securely hold the sensors within cavity 104 during use of the unit.

Secured to opposite ends of the sensors are mounting boards 116 and 118, board 116 being mounted on the upper end of sensor 58 by means of suitable fasteners 120 and board 118 being mounted on the lower end of sensor 60 by means of suitable fasteners 122. Mounting board 116 carries the power supply 79 and electronics package 92, while mounting board 118 carries the magnetic compass 42, the boards serving to fasten these components rigidly to the sensor units for secure mounting within housing 90. Again, the boards may be provided with suitable radial spacers to properly locate these components within cavity 104.

Electric cables 124, 126 and 128 interconnect the compass 42 and the sensors 58 and 60, respectively, to the electronics package 92, while electrical cable 130 connects the power supply 79 thereto. Borehole cable 18 includes electrical wiring 132 which passes through the threaded cap 106 and is sealed therein in known manner to provide electrical communication between the electronics package of magnetometer unit 16 and the instrumentation at the surface of the earth. The magnetometer is supported mechanically by the conventional borehole cable, which may be secured to the unit by means of fastener 134.

Figure 5:
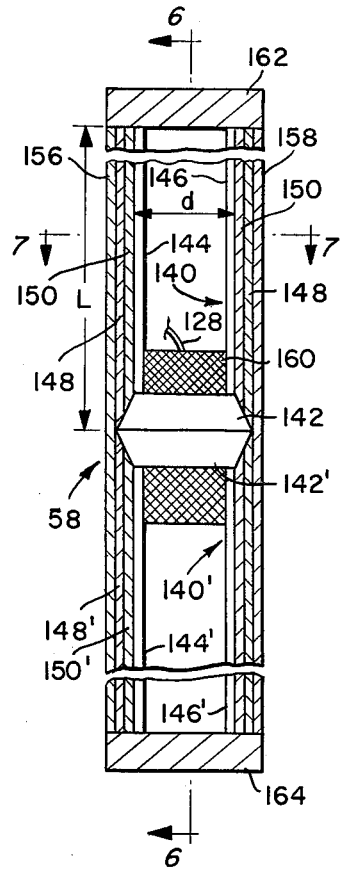
FIG. 5 is a sectional view of one sensor unit from the magnetometer of FIG. 4 taken along lines 5—5 of FIG. 7.

The structural details of sensor 58 are illustrated in FIGS. 5 through 8, but it should be understood that sensor 60 is identical thereto. The sensor comprises two generally U-shaped magnetic core segments each having a base portion with two elongated, parallel legs extending from opposite ends thereof. The bases of the two core segments are arranged in back-to-back relationship with the legs extending in opposite directions to that the two core segments form a generally H-shaped sensor lying in a single plane, as illustrated in FIG. 5.

The first, or upper, core segment 140 of sensor 58 consists of a base portion 142 and parallel elongated leg portions 144 and 146 extending from opposite ends of base 142 so that the legs are spaced apart by a distance equal to the length of the base. Although the length of the base portion 142 is exaggerated with respect to the length of leg portions 144 and 146 for purposes of illustrating the structure of sensor 58, it should be understood that the length L of the leg portions is large with respect to the length d of the base portion, the legs being on the order of six to ten times the length of the base. The extreme relative length of the legs 144 and 146 provides a large area of interaction between the core segment and the magnetic field to be detected, and thus provides a high degree of sensitivity to the fields of interest. The short length of the base portion 142 provides a small effective diameter for the sensor so that it will fit within the relatively small inner diameter of housing 90, thereby accommodating the magnetometer to use in small-diameter exploratory boreholes.

Figure 6:
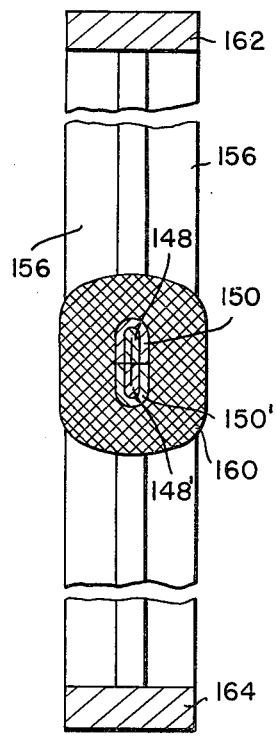
FIG. 6 is a cross-sectional view of a sensor unit taken along lines 6—6 of FIG. 5.
Figure 7:
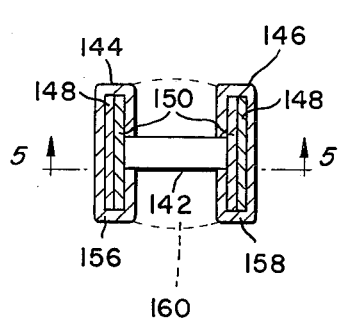
FIG. 7 is a sectional view of a sensor taken along lines 7—7 of FIG. 5.
Figure 8:
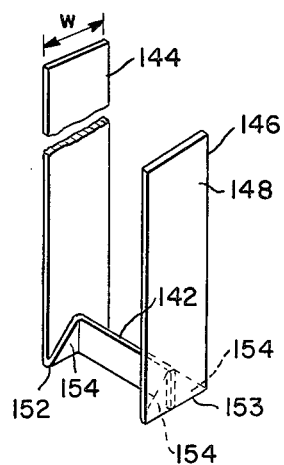
FIG. 8 is a perspective view of a single laminate folded to form part of a core segment for the sensor of FIG. 5.

In the preferred form of the invention, the core segment 140 is constructed of a plurality of very thin, elongated, continuous laminations of a high permeability material such as mu-metal, each laminate extending from one end of the core segment to the other. A preferred sensor utilizes a core of eleven laminations, each being 0.004 thick and with each lamination being continuous for the full length of the core; that is, each lamination extends the full length of leg 144, is folded to extend across the width of the core to form base 142, and is folded again to extend the full length of the opposite leg 146. For clarity of illustration, core segment 140 is shown as being constructed of only two laminations 148 and 150, with laminate 148 being illustrated in perspective in FIG. 8, but it should be understood that numerous laminations are used. As illustrated, laminate 148 forms a part of leg portion 144, is folded upwardly at the bottom 152 of the leg portion to form a part of the base portion 142, and is folded upwardly again at the bottom 153 of the leg portion 146 to form a part of that leg. Although a number of fold configurations are possible, in one form the laminate 148 is doubled over in the base portion 142 to form a double thickness (see FIG. 6), this double thickness being formed by means of triangular folds 154 at each side of the base portion 142. Similar folds are made at the bottom 153 of leg portion 146 (shown in phantom in FIG. 8). By reason of this particular folding arrangement, the width w of the laminate 148, which may be about ½ inch, is reduced in the base portion 142 to one-half its width in legs 144 and 146. However, this fold allows the base portion to be perpendicular to and centered with respect to the width of laminate 148 for easier winding of the coil to be described. As seen in FIG. 6, upon assembly of the core segment 140, the folded-over portions which form the base 142 are stacked and folded one over the other, while the laminations forming the leg portions 144 and 146 remain flat.

The sensor 58 includes a second core segment 140' which is a duplicate of the segment 140, and accordingly it is similarly numbered, with the numbers being primed.

The two sensor elements are positioned with the respective base portions 142 and 142' in back-to-back relationship as illustrated in FIGS. 5 and 6, and with the corresponding leg portions extending in opposite directions. The base portions define the plane of the sensor, and the legs lie in that plane, although the individual lamination in the leg portions are perpendicular to the plane of the sensor.

After assembly of the laminations to form the two core segments 140 and 140', and after positioning them in back-to-back relationship, the corresponding legs 144, 144' and 146, 146' on each side of the sensor 58 are secured in corresponding channel members 156 and 158. These channel members are substantially C-shaped and are crimped tightly around the laminations to secure them in assembled relationship, each channel extending the full length of the sensor so that channel 156 surrounds and secures legs 144 and 144' while channel 158 surrounds and secures legs 146 and 146'. Preferably, the channels 156 and 158 are of a non-magnetic material such as stainless steel.

Assembly of the laminations and of the core segments in the manner described forms the H-shaped core of sensor 58. This core is then suitably heat-treated, as by firing it to a temperature of approximately 1200° C. for three hours and then allowing it to cool, to produce the desired high permeability. Thereafter, a sensor coil 160 is wound around the abutting base portions 142 and 142', the coil being formed from approximately 8,000 turns of very fine wire. A pair of spacer blocks 162 and 164 are secured to the outer ends of the core legs, spacer 162 spanning legs 144 and 146, and spacer 164 spanning legs 144' and 146'. The spacers 162 and 164 provide mechanical support for the elongated leg portions and serve as well to receive the fasteners 144, 120 and 122 to enable the magnetometer unit to be assembled in the manner previously described. Therefore, the spacers 162 and 164 must be securely attached to the sensor unit and it is preferred that they be welded to the clamping members 156 and 158. The blocks may be of any nonmagnetic material, but again stainless steel is preferred for strength and durability.

Figure 9:
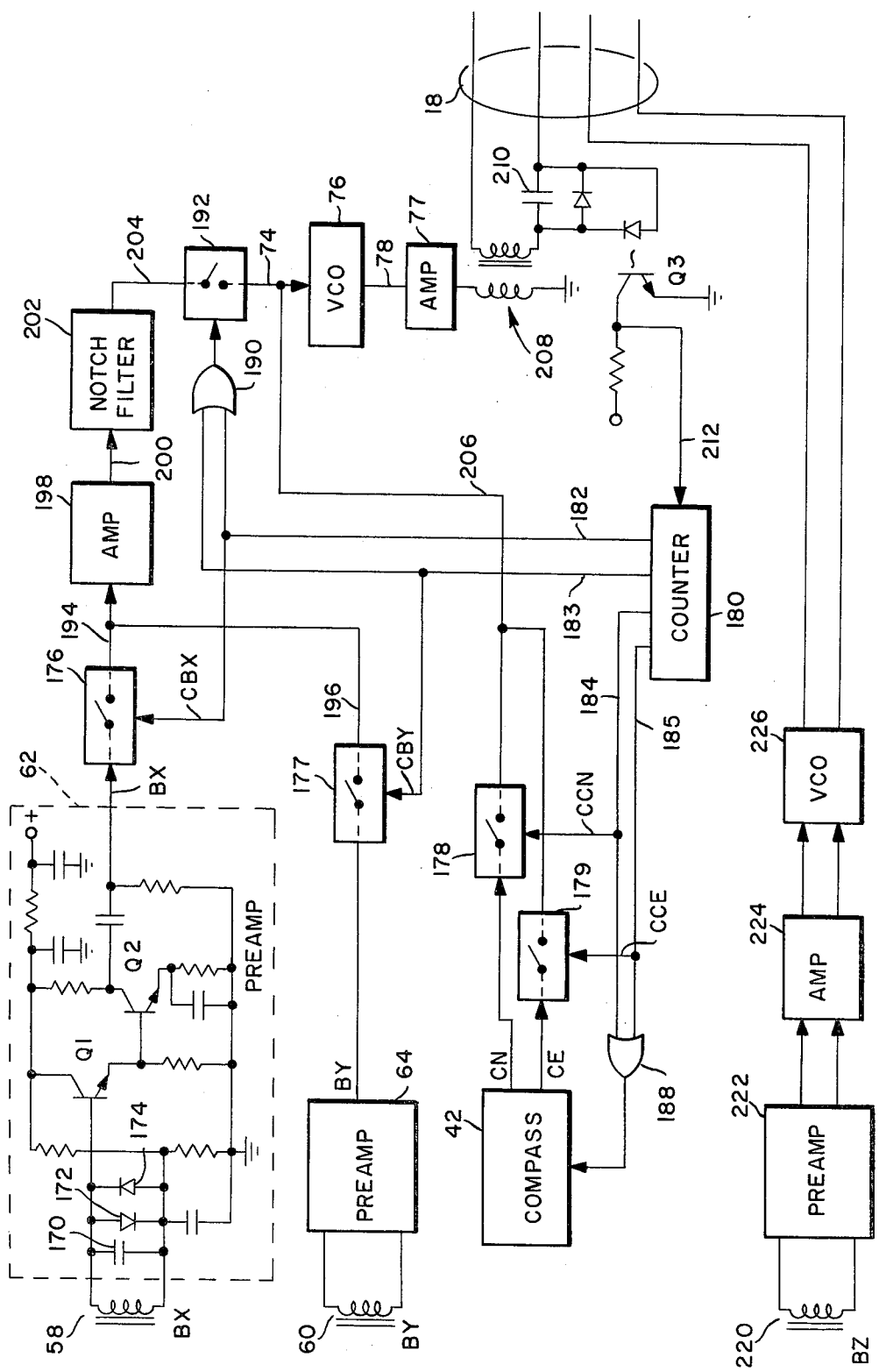
FIG. 9 is a more detailed illustration of down-hole circuitry for use in the present invention.
Figure 10:
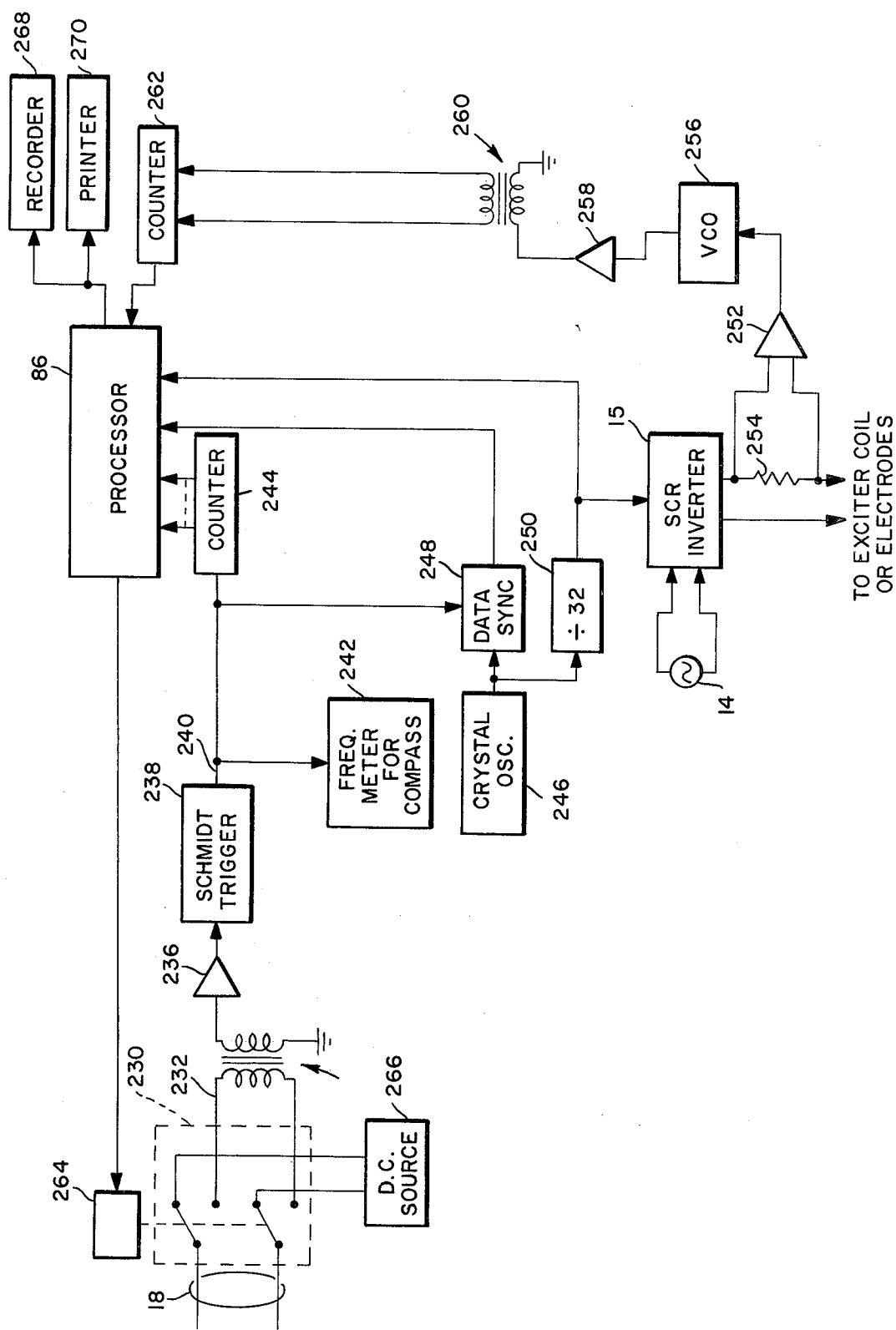
FIG. 10 is a more detailed illustration of surface electronics for the present invention.

The circuitry of FIG. 3 is illustrated in greater detail in FIGS. 9 and 10, to which reference is now made. As shown, the horizontal components BX and BY of the A.C. field are measured by means of sensors 58 and 60, while fluxgate compass 42 measures the north and east orientation of the probe, and provides outputs CN and CE which represent the earth's magnetic field. Only one of the field sensors is in operation at any one time, and the output data of each is transmitted to the surface by a frequency modulated carrier at about 100 kHz.

The outputs from the sensor coils 58 and 60 are each connected to their corresponding preamplifiers 62 and 64 by way of a resonant circuit, which includes capacitor 170, and oppositely connected parallel diodes 172, 174. The preamps each include a pair of transistors Q1 and Q2 connected in a standard low noise, high performance configuration, the particular preamp design not being a part of this invention. The outputs from compass 42 may be fed through similar preamps 48 and 50 if necessary.

The outputs from the sensor and compass coils are sequentially switched by a suitable multiplexer, which is functionally illustrated in FIG. 9 as including four analog switches 176, 177, 178 and 179 connected to the outputs BX and BY of the A.C. field sensors 58 and 60 and to the outputs CN and CE of the compass 42, respectively. Switching is accomplished by means of a ring counter 180 which sequentially operates the switches 176–179 by way of control outputs, CBX, CBY, CCN and CCE on lines 182, 183, 184 and 185, respectively. The outputs on lines 184 and 185 are also connected through OR gate 188 to activate the fluxgate compass only when one of its outputs is to be selected for transmission. Similarly, the outputs on lines 182 and 183 are connected by way of OR gate 190 to a main sensor switch 192, which is another analog switch connecting the sensor outputs to the voltage controlled oscillator 76. Preferably the multiplexing function is performed by a CMOS CD4017 ring counter and CMOS CD4016 analog switches, although other devices can be used.

The outputs from switches 176 and 177 are supplied by way of lines 194 and 196 to an amplifier 198, the output of which is fed by way of line 200 to a suitable notch filter 202. The version illustrated in FIG. 9 differs from that of FIG. 3 in that only a single notch filter is required, with the multiplexer selecting which sensor signal is to be filtered; otherwise, the function is the same as in FIG. 3. Thus, the notch filter is designed to pass the frequency of the A.C. field applied by the surface excitation, and to effectively block any signals that might be produced by other A.C. fields, thereby improving the sensitivity of the present system.

The output from filter 202 is fed to the voltage controlled oscillator 76 by way of lines 204 and 76 whenever switch 192 is activated by the selection of sensors 58 or 60. When the compass 42 is selected, the outputs CN or CE are supplied by way of switches 178 or 179, respectively, to line 206 and thence to line 74 and VCO 76. The frequency of oscillator 76 is varied in accordance with the amplitude of the signals applied thereto by the sensors or the compass, and the frequency-modulated output on line 78 is amplified in amplifier 77 and supplied by way of isolating transformer 208 to the cable 18. The VCO 76 may be a conventional CMOS CD4046 voltage controlled oscillator.

The counter 180 is advanced by the surface controller by means of a D.C. pulse sent down the logging cable 18. This count advance pulse is detected by an optical isolator Q3 which is connected across a capacitor 210 which is connected in line 18, the output of the isolator driving the counter by way of line 212. The counter is stepped one count each time a D.C. pulse is detected to enable a single probe sensor or compass output at a time.

In addition to the data furnished by sensors 58 and 60 and by compass 42, one other measurement is needed to obtain the desired information concerning underground strata. That measurement is of the vertical component of the A.C. magnetic field, and is obtained by means of a standard low noise mu metal induction coil sensor 220, illustrated in FIG. 9. This sensor, which may be an elongted strip of mu metal about one meter in length wrapped at its center by a coil of about 30,000 turns, produces an output corresponding to the vertical field component BZ. This signal is supplied to a preamp 222, an amplifier 224, and a voltage controlled oscillator 226, all of which are similar to the components previously described. The vertical field component probe may be a separate sensor lowered down the borehole after completion of the horizontal field component measurements described above, in which case it will be provided with its own borehole cable, may be connected to the horizontal field probe 16 as indicated in FIG. 9, in which case it may share the borehole cable 18, or may be integrated with the probe 16. In the latter event, the vertical field probe may be connected through the multiplexer switching to share the VCO 76. It has been found, however, that combining the vertical and field sensors makes the unit overly bulky and complicated, and it is preferred that separate probes be used. However, the surface processing of the data remains the same in any of these arrangements.

The surface processing of information is accomplished by means of microprocessor 86, illustrated in FIG. 10. The frequency modulated information carried on the borehole line 18 is supplied through suitable switching 230, surface line 232, and through isolating transformer 234 to the detector 84, which may comprise an amplifier 236 and a Schmidt trigger 238. The Schmidt trigger is driven by the signals received from the downhole instruments to produce a train of pulses having a frequency equal to the frequency of the output from the voltage controlled oscillator. The pulses are applied by way of line 240 to a frequency meter 242, which is activated when the compass 42 is selected by the downhole counter, and to a counter 244, which is activated when the probe sensors 58 or 60 are selected. When the compass is selected, the frequency of the signal sent to the surface is linearly related to the amplitude of the appropriate component of the earth's magnetic field, and this VCO output is read on the frequency meter 242. This meter is a commercially available ICM 7226A meter supplied by Intersil Corp.

A crystal oscillator 246 synchronizes the data processing circuitry by way of a data latch 248 and a divider 250 which synchronizes the processor 86 with the signals received from the downhole sensors. The oscillator also drives the SCR inverter 15 through the divider network 250 to produce the square wave current signals used to generate the A.C. field to be measured, the use of a single oscillator thereby assuring synchronization of the excitation currents and the signal processing.

The excitation current is mounted by means of a difference amplifier 252 connected across a resistor 254 (FIG. 10) connected in series with the excitation current lines leading to coil 10 (FIG. 1) or electrodes 24, 25 (FIG. 2). The output of the difference amplifier, which is proportioned to the voltage crop across the resistor, is applied to a voltage controlled oscillator 256, the output of which is supplied through amplifier 258 and isolating transformer 260 to a counter 262. This counter, which is similar to counter 244 in the data channel, supplies a count proportional to the excitation current.

The microprocessor functions to average the data signals received over a preselected period of time. This is accomplished by a simple data stacking technique wherein each cycle of the primary excitation is divided into 32 "equivalent" channels. The number of zero crossings generated by the downhole VCO is linearly related to the instantaneous voltage output of the selected sensor. The processor samples the output of counter 244, computes the number of zero crossings in each time channel, and then adds the result to the appropriate channel locations in its memory.

After adding (i.e., stacking) the data in this manner for a selected period of time, for example, between 5 and 30 minutes, the contents of the 32 channels are Fourier analyzed and divided by the number of cycles that have been stacked to give the amplitude and phase of the A.C. magnetic field component. The processor may then advance the downhole counter by activating switch 230. This may be accomplished, for example, by solenoid 264 or by suitable analog switching to disconnect the borehole line 18 from transformer 232 and to connect line 18 to a source 266 of direct current. This produces a D.C. signal on line 18 which activates counter 180 (FIG. 9) as described above. The process then repeats itself for the next sensor or compass output, accomplishing additional data stacking as described.

The information collected and processed by the processor 86 may be stored on a suitable recording means such as a casette recorder 268, or may be displayed by a conventional printer 270, for later evaluation. After both the horizontal and vertical components of the A.C. magnetic field and the earth's magnetic field components have been measured and stored, the data so obtained provides valuable information concerning the nature of the strata in which the measurements were made. Such data is far more accurate than that previously available with prior systems, and permits well logging at depths and at lateral distances from the borehole that were unattainable with prior devices and systems.

In testing the magnetometer constructed in accordance with the foregoing description, it was found that magnetic field components excited by a current loop source of the type illustrated in FIG. 1 or by a current dipole source of the type illustrated in FIG. 2 could be measured with a high degree of sensitivity. It was found that perturbations in the A.C. magnetic field generated by a surface source can be identified even at very great depths, on the order of 4,800 feet, and can produce significant data concerning the structure of the strata in the area of the measurements. Good results were obtained at both 7 Hz and 36 Hz, giving data which permitted accurate interpretation of the strata adjacent the borehole as well as that spaced a considerable distance laterally away from the borehole location.

Although the present invention has been described in terms of a preferred embodiment thereof, it will be understood that numerous variations and modifications can be made without departing from the true spirit and scope thereof as described in the following claims:

What is claimed is:

1. A magnetometer for use in measuring subsurface A.C. injected magnetic fields for borehole logging, comprising;
    first and second magnetic field sensors, said first sensor lying in a first plane and said second sensor lying in a second plane;
    fastening means for securing said sensors in axial alignment with the plane of said first sensor perpendicular to the plane of said second sensor;
    an elongated heat-insulating housing adapted to receive said sensors, said housing having a relatively small diameter and being adapted for insertion vertically into a borehole;
    said first and second sensors each including:
        first and second generally U-shaped core segments each having first and second spaced, parallel, elongated leg portions extending from opposite ends of a relatively short base portion, said first and second core segments being arranged in back-to-back relationship with their base portions abutting each other;
        channel means securing corresponding leg portions of said core segments to hold said segments in assembled relationship to form a generally H-shaped core having elongated leg portions extending parallel to, and defining, the sensor axis; and
        coil means surrounding said abutting base portions;
    circuit means connected to the coil means of each said sensor for producing signals representing A.C. magnetic field components detected by said first and second sensors; and
    means for securing said circuit means on at least one of said sensors.

2. The magnetometer of claim 1, wherein each said core segment comprises a plurality of thin, narrow, flat, elongated, continuous sheets secured in stacked relationship by said channel means to form a laminated segment, each sheet extending the full length of said core segment, each said sheet being folded into a U-shape to form said elongaged leg portions and said base portion.

3. The magnetometer of claim 2, wherein each of said elongated leg portions is about 10 times the length of said base portion.

4. The magnetometer of claim 3, wherein said laminated sheets are formed from high permeability metal.

5. The magnetometer of claim 3, wherein said channel means is generally C-shaped in cross-section and is crimped around said laminated sheets.

6. The magnetometer of claim 3, further including spacer means fastened to and extending between the free ends of the leg portions of each said core segment.

7. The magnetometer of claim 6, wherein said fastener means is connected between a spacer means on said first sensor and a spacer means or said second sensor, said fastener means securing said sensors in coaxial spaced relationship whereby the sensors have an effective diameter smaller than the inner diameter of said housing and wherein said magnetometer has a substantial axial length.

8. The magnetometer of claim 3, wherein said coil means for each sensor includes on the order of 8,000 turns, said coil means surrounding each of said continuous lamination sheets for said first and second core segments.

9. The magnetometer of claim 8, wherein the elongated leg portions of each of said folded continuous lamination sheets lie in parallel spaced planes and wherein said base portion lies in a plane which includes the sensor axis and which is perpendicular to said parallel, spaced planes.

10. The magnetometer of claim 9, wherein said base portion of each lamination sheet is formed by folding the lamination sheet longitudinally, whereby said base portion is double the thickness of said leg portions.

11. The magnetometer of claim 1, wherein said circuit means comprises a voltage controlled oscillator, multiplexer means for connecting said coils sequentially to modulate the output signal from said oscillator; and
    means for connecting said output signal to data processing equipment.

12. The magnetometer of claim 11, wherein said surface data processing equipment comprises detector means for demodulating said oscillator output signals and signal averaging means for accumulating said demodulated output signals over a predetermined period of time.

13. The magnetometer of claim 1, further including means for producing an A.C. magnetic field in subsurface strata; and
    means for positioning said magnetometer within a borehole passing through said strata.

14. A magnetometer system for measuring A.C. injected magnetic fields for borehole logging, comprising:
    surface means for producing in subsurface strata an A.C. magnetic field;
    first and second magnetic field sensors, each sensor including first and second generally U-shaped core segments each having first and second spaced, parallel, elongated leg portions extending from opposite ends of a relatively short base portion, said first and second core segments with their base portions abutting each other, channel means securing corresponding leg portions of said core segments being arranged in back-to-back relationships to hold said segments in assembled relationship to form a generally H-shaped core having elongated leg portions extending parallel to, and defining, the sensor axis, and coil means surrounding said abutting base portions;

fastening means for securing said sensors in axial alignment with the plane of said first sensor being perpendicular to the plane of said second sensor;

an elongated housing for said sensors, said housing having a relatively small diameter and being adapted for insertion vertically into a borehole;

notch filter means for passing signals having the frequency of said A.C. magnetic fields;

multiplexer switching means connecting the output of a selected one of said sensor coils to the input of said notch filter;

surface data processing equipment;

cable means for connecting said magnetometer to said surface data processing equipment; and transmitter means responsive to the output from said notch filter to transmit to said surface equipment signals corresponding to said A.C. magnetic fields.

15. The magnetometer of claim 14, wherein said transmitter means is a voltage controlled oscillator.

16. The magnetometer of claim 15, wherein said multiplexer switching means includes counter means for selectively connecting one of said sensors to said notch filter.

17. The magnetometer of claim 16, further including compass means mounted in said housing, said compass means having at least one output representing the direction and strength of the earth's magnetic field, said multiplexer switching means further including switch means connecting the output of said compass to said transmitter means.

18. The magnetometer of claim 14, wherein said surface data processing equipment comprises:

means responsive to said signals from said transmitter for producing a train of pulses having a frequency corresponding to said transmitted signals;

counter means for receiving said train of pulses; and processor means for receiving and accumulating received pulses over a preselected time period and for averaging the accumulated values to obtain the amplitude and phase of said A.C. magnetic field.

19. The magnetometer of claim 18, wherein said surface data processing equipment further includes crystal oscillator means for synchronizing said processor means and said A.C. magnetic field.

20. The magnetometer of claim 19, wherein said surface data processing equipment further includes means for advancing said magnetometer multiplexer means.

* * * * *

UNITED STATES PATENT AND TRADEMARK OFFICE
CERTIFICATE OF CORRECTION

PATENT NO. : 4,323,848

DATED : April 6, 1982

INVENTOR(S) : ARTHUR F. KUCKES

It is certified that error appears in the above–identified patent and that said Letters Patent are hereby corrected as shown below:

Claim 7, line 3, change "or" to --on--.

Claim 14, line 10, after "segments" insert --being arranged in back-to-back relationship--.

Claim 14, line 13, cancel "being arranged in back-to-back relationships".

Signed and Sealed this

Sixth Day of July 1982

[SEAL]

Attest:

*Attesting Officer*

GERALD J. MOSSINGHOFF

*Commissioner of Patents and Trademarks*